June 20, 1967 E. V. SCHNEIDER ETAL 3,327,187

PHASE SENSITIVE CIRCUIT WITH SELECTIVELY ENERGIZABLE LOADS

Original Filed Aug. 8, 1963 2 Sheets-Sheet 1

INVENTORS
EMMOR V. SCHNEIDER
BY ANDREW F. DEMING
Woodling, Krost, Granger and Rust
ATTORNEYS INVENTORS
EMMOR V. SCHNEIDER
BY ANDREW F. DEMING
Woodling, Krost, Granger and Rust
ATTORNEYS 3,327,187
PHASE SENSITIVE CIRCUIT WITH SELECTIVELY ENERGIZABLE LOADS Emmor V. Schneider and Andrew F. Deming, Alliance, Ohio, assignors to Consolidated Electronics Industries Corp., a corporation of Delaware Continuation of application Ser. No. 300,838, Aug. 8, 1963. This application May 23, 1966, Ser. No. 552,297
12 Claims. (Cl. 318—29)

This application is a continuation of our pending application Ser. No. 300,838, filed Aug. 8, 1963, entitled, Phase Sensitive Circuit, now abandoned.

The invention relates in general to phase sensitive circuits, and more particularly to a circuit having an input of first and second phases relative to an alternating voltage source with these two signals amplified in a common amplifier to control a load in first and second conditions. The load may be actually first and second selected loads or it may be a single load operated in first and second conditions, neither of which is an off condition. For example, the load may be a bi-directional motor operated selectively in the first and second directions in accordance with the first and second phases of an alternating voltage input signal.

One use of the invention is in an automatic antenna rotator circuit which may be remotely controlled. An input signal may have either of first or second half cycles of the input voltage as first and second phase conditions of the input signal. This signal is amplified in a common amplifier, the output of which controls a load such as a motor of the antenna rotator to rotate in either of first or second directions. Additionally, the motor may drive a variable impedance to effect a rebalance of the input signal and thus establish a servomotor follow-up system.

Accordingly, an object of the invention is to provide a circuit including a common amplifier to amplify either of first and second differing phase signals, and the output of the amplifier is supplied to control a load in either of first or second conditions.

Another object of the invention is to provide an alternating current phase reversal sensing circuit wherein two differing phase signals may be amplified in a common amplifier and applied to a load in first and second selected circuit paths, in accordance with the phase of the input signal, to control a load in first and second conditions.

Another object of the invention is to provide an automatic antenna rotator controlled by a variable input signal which has two different phase characteristics and which is amplified in a common amplifier to be applied to two different load circuit paths, controlling selected bi-directional rotation of the antenna.

Another object of the invention is to provide a follow-up motor control circuit wherein two different phase signals on the input are amplified and applied selectively to two different load circuits with one load circuit selecting the direction of movement of a drive means and the other load circuit selecting the energized and de-energized condition of the entire system.

Another object of the invention is to provide a manual switch having first and second contacts wherein a first contact may be closed to energize the entire system and simultaneously, a second switch is opened and this switch is in series with relay contacts which select the direction of motor rotation of the output with the second switch contacts not closing until the selected direction of the motor has been chosen.

Another object of the invention is to provide a phase discriminating apparatus in which a common amplifier is connected in series with two separate circuit paths of differing phase responsive character so that phase reversal of the input causes phase selective current flow in the separate circuit paths.

Another object of the invention is to provide a phase selective circuit having an input with two different phase conditions and amplifier in a common amplifier to be supplied to first and second relay means selectively in accordance with the phase of the input signal.

Other objects and a fuller understanding of the invention may be had by referring to the following description and claims, taken in conjunction with the accompanying drawings, in which:

Figure 1:
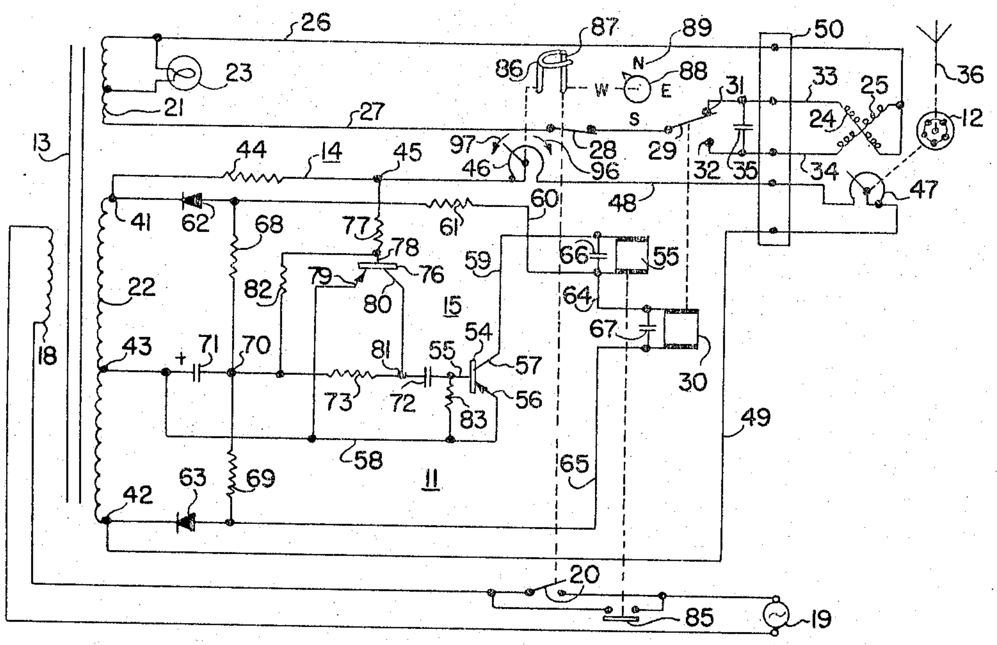
FIGURE 1 is a circuit diagram of the invention applied to a motor control system including a follow-up or closed loop servomotor system.

The circuit of FIGURE 1 shows the preferred embodiment of the invention which has been applied for purposes of explanation only, to an antenna rotator. FIGURE 1 shows a phase sensitive circuit 11 used to control a motor 12. The circuit of FIGURE 1 includes, generally, a transformer 13 energizing the motor 12 and additionally a bridge circuit 14 and an amplifier circuit 15. The transformer 13 has a primary 18 energized from an alternating voltage source 19 through first manual switch contacts 20. The transformer has first and second secondaries 21 and 22 with the first secondary 21 energizing a pilot lamp 23 and connected to energize motor windings 24 and 25. A conductor 26 extends from the secondary 21 to a common terminal of the motor windings 24 and 25 and a conductor 27 extends from the other end of the secondary 21 through manual switch second contacts 28 and through single pole double throw contacts 29 of relay 30 selectively through contacts 31 and 32 and through conductors 33 and 34 selectively to the motor windings 24 and 25. A capacitor 35 is connected across the conductors 33 and 34 to provide a leading or lagging phase current to the motor winding 25 relative to motor winding 24. By this means the rotor of the induction motor 12 may be rotated selectively in either direction to rotate an antenna 36 as representative of a load.

The bridge circuit 14 is energized from end terminals 41 and 42 of the transformer secondary 22, which secondary also has a mid tap 43. The bridge circuit 14 also includes a first impedance 44 and an output terminal 45 and first and second potentiometers 46 and 47 connected in series across the end terminals 41 and 42. Thus, the first impedance 44 is a first leg of the alternating current bridge 14 and the first and second potentiometers 46 and 47 connected in series by conductors 48 and 49 constitute the second leg of this bridge. The two halves of the secondary 22 may be considered as the voltage source for the bridge plus the third and fourth legs of this bridge as well. The mid tap 43, thus, is the second output terminal of this bridge. All five conductors 26, 33, 34, 48 and 49 may pass through a terminal strip 50 and thus it will be seen that the antenna rotator or load motor 12 may be remotely connected to the phase sensitive circuit 11 by a five conductor cable.

The output terminals 43 and 45 supply a phase sensitive input signal to a common amplifier, in this case shown as a transistor 54, as a part of the amplifier circuit 15. The motor 12 is a load responsive to two different phase conditions and as controlled through the relay 30 and a relay 55.

The transistor 54 has a base 53, an emitter 56 and collector 57. The emitter 56 is connected by a conductor 58 to the mid tap 43. The collector 57 is connected by a conductor 59 through the coil of the relay 55, a conductor 60, a voltage dropping resistor 61 and through a first diode 62 to the first end terminal 41. The collector 57 is also connected through the conductor 59, the coils of relays 55 and 30 in series by means of a conductor 64 and a conductor 65 through a second diode 63 to the end terminal 42. Filter capacitors 66 and 67 are connected across the coils of relays 55 and 30, respectively.

The first and second diodes 62 and 63 supply a DC voltage by means of filter resistors 68 and 69 connected in series across the anode of the diodes 62 and 63. The junction 70 between the resistors 68 and 69 is connected through a filter capacitor 71 to the mid tap 43. The polarity of the diodes 62 and 63 makes the junction terminal 70 negative relative to the mid tap 43. The base 53 of the transistor 54 is connected through a coupling capacitor 72 and a resistor 73 to the terminal 70.

A transistor pre-amplifier 76 may be provided in the amplifier circuit 15 for added sensitivity. Although such pre-amplifier may be omitted where coarse control is sufficient or where an impedance matching transformer is used. The bridge output terminal 45 is connected through a current limiting resistor 77 to the base 78 of the transistor 76 and the emitter 79 of the transistor 76 is connected to the mid tap 43, which is the other output terminal of the bridge. Accordingly, the bridge output is applied to the input electrodes of the transistor 76. The collector 80 of the transistor 76 is connected to a terminal 81 at the junction of capacitor 72 and resistor 73. Accordingly, the output circuit of the transistor 76 may be traced from the positive DC source terminal 43 through the emitter 79, the collector 80 and the resistor 73 to return to the DC source negative terminal 70. Accordingly, resistor 73 is the load resistor of the pre-amplifier transistor 76 and is the source of input signals supplied through the coupling capacitor 72 to the main transistor amplifier 54.

The relay 55 actuates hold-in contacts 85 which are normally open and which are in parallel with the first manual switch contacts 20, to maintain the transformer 13 energized after energization of the relay 55. The first potentiometer 46 may be the control potentiometer and is one example of a variable impedance which controls the phase of the input signals. The movable blade of this first potentiometer 46 is moved through a lost motion means depicted as a yoke 86 and a pin 87 therebetween. A manual control knob 88 moves the potentiometer 46 through this lost motion means 86–87. The knob 88 may cooperate wtih a scale or other indicia 89 to indicate the desired rotational direction of the motor driven antenna 36. The lost motion means 86–87 may take one of many forms, for example, it may be that as shown in the copending application Ser. No. 100,152 entitled Remote Control Device filed Apr. 3, 1961; now Patent No. 3,126,506, issued Mar. 26, 1964. Movement of the knob 88 first takes up the lost motion and then moves the movable blade of the potentiometer 46. As the lost motion means 86–87 is actuated, the first and second manual switch contacts 20 and 28 are actuated. This movement opens switch contacts 28 and closes contacts 20, and release of the knob 88 performs the opposite function, namely, to close contacts 28 and open contacts 20. The motor 12 is connected to drive the second potentiometer 47 for a follow-up or closed loop servomotor system.

*Operation*

The circuit of FIGURE 1 may be operated by grasping the manual knob 88 and moving it to a new selected position for the antenna 36. The potentiometer 47 may be the type which will permit a full 360 degree rotation and alternatively, the potentiometer 47 may be of the ordinary type of about 300 degree rotation but geared to the motor 12 so that a full 360 degree rotation o fthe antenna

36 establishes a full 30 degree rotation between stops of the potentiometer 47.

Figures 2A, 2B, 2C, 2D:
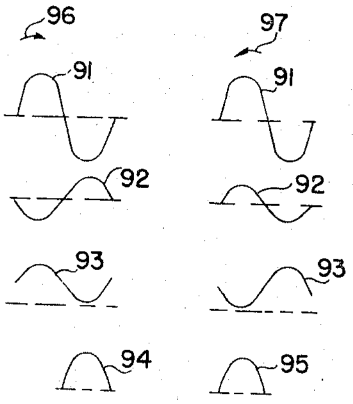
FIGURE 2 is a graph of voltage and current conditions explaining the operation of the circuit of FIGURE 1.

Assume that the antenna is oriented toward the east and the knob 88 is grasped and rotated clockwise, as per arrow 96, to the south position. This movement of the knob 88 actuates open the manual switch contact 28 and actuates closed the manual switch contact 20, by means of the lost motion connection 86–87 before the potentiometer 46 is moved. This lost motion may be only one to three degrees, for example, just sufficient to actuate switches 20 and 28. The closing of the first manual switch contact 20 energizes the primary 18 and the entire transformer 13. The opening of the second manual switch contacts 28 prevents energization of the motor 12 at this time. The energization of the transformer secondary 22 energizes both the bridge circuit 14 and the amplifier circuit 15. The clockwise movement of potentiometer 46 decreases the resistance thereof and hence decreases the impedance in this second leg of the bridge which includes potentiometer 46 and 47. Accordingly, the alternating current bridge 14 will have an output voltage at terminals 43 and 45. This output voltage will either be in phase with the voltage from mid tap 43 to terminal 41 or from mid tap 43 to terminal 42. In this case, with the decreasing resistance of potentiometer 46, the potential of terminal 45 will shift in phase to the right, and hence the voltage from mid tap 43 to terminal 45 will be in phase with the source voltage from mid tap 43 to end terminal 42. FIGURE 2A illustrates the voltage curve 91 of the voltage of terminal 41 relative to terminal 42, as a reference. Thus, when terminal 41 goes positive, the output terminal 45 will go negative because this output signal is directly out of phase with the voltage from terminals 42 to 41. This condition is illustrated in the left half of FIGURES 2A–2D and the output signal 92 of the bridge is illustrated in FIGURE 2B. This is shown as being out of phase with the reference voltage 91 which is the voltage from terminal 42 to terminal 41. Thus, in the first half cycle, when terminal 41 is positive terminal 45 goes negative. This applies a negative bias to the base 78 of transistor 76 causing this transistor to increase conduction through the load resistor 73. This transistor current is shown in FIGURE 2C as curve 93. The terminal 81 thus becomes increasingly positive on this half cycle and, hence, the transistor 54 is biased into complete nonconduction.

A bias resistor 82 is connected between the base 78 of transistor 76 and terminal 70. This provides a small leakage current so that transistor 76 is biased into a partially conducting region. A self bias resistor 83 is connected between the base 53 and emitter 56 of transistor 54, with transistor 54 normally biased in a substantially nonconducting state. This transistor 54 is normally biased by resistor 83 as a self bias resistor and, hence, the normal condition of this transistor 54 is substantially a nonconducting condition. During the next half cycle of the reference voltage 91, however, the bridge output voltage at terminal 45 is going positive and this decreases the conduction of transistor 76 to make the terminal 81 less positive or more negative. This more negative voltage swing is applied through the coupling capacitor 72 to the base 53 of transistor 54, hence biasing it into a conducting state. The current through the main transistor 54 is shown as curve 94 in FIGURE 2D. Accordingly, a half wave pulse of current 94 is passed by the transistor 54 in the second half cycle of the reference voltage 91. This half wave pulse of current passes through the collector 57 and through the coil of relay 55, the voltage dropping resistor 61 and diode 62 to the terminal 41 which is at that time negative. Current cannot flow from the collector 57 through the two relay coils 55 and 30 in series to the terminal 42 because it is at that time positive and the path is open circuited by diode 63. The capacitor 66 across the coil of the relay 55 smoothes these half wave pulses to maintain this relay 55 energized. The contacts 85 of this relay 55 are thus closed to maintain energized the transformer 13. At this time the knob 88 may be released and this will open the contacts 20 but this has no effect on the circuit since in the practical case, the relay 55 will be energized in less than 1/10 second after movement of potentiometer 46 to unbalance the bridge circuit 14.

The relay 30 has not been energized, hence, the closing of contact 28 establishes a motor energization circuit directly to motor winding 24 with leading current supplied through capacitor 35 to the motor winding 25. Accordingly, the motor 12 will run in a clockwise direction to rotate the antenna 36 to the desired south orientation. Also, the potentiometer 47 is rotated clockwise to increase the resistance thereof and upon rebalance of the bridge circuit 14, the output voltage of the bridge falls to a null and thus the relay 55 will become de-energized to open contacts 85 and de-energize the complete circuit 11. This will be where the antenna 36 has been positioned to the desired orientation as established by movement of the potentiometer 46 in this clockwise direction.

Now assume that the potentiometer 46 is moved counterclockwise, as shown by arrow 97 in FIGURE 1 and by the right half of FIGURE 2. This counterclockwise movement increases the resistance of potentiometer 46. This shifts the phase of the terminal point 45 to the left, that is, the bridge output voltage from terminals 43 to 45 is in phase with the voltage from terminals 43 to 41 of the reference voltage 91. FIGURE 2B shows this voltage curve 92 now as being in phase with the reference voltage 91 of FIGURE 2A. As the potential of terminal 41 swings positive, the potential of terminal 45 also swings positive and this tends to decrease the conduction through the transistor 76. This is shown in the curve 93 in the right half of FIGURE 2C. This decreasing current through transistor 76 decreases the current through the load resistor 73 and hence, the potential of terminal 81 is less positive or more negative. This more negative swinging voltage is applied through coupling capacitor 72 to the base 53 of transistor 54 to thus cause conduction of this transistor 54. This is shown by the pulse of current 95 in FIGURE 2D. This current pulse is in the first half cycle of the reference voltage. This pulse of current is passed through the transistor 54 and goes from collector 57 through the two relay coils 55 and 30 in series and through the diode 63 to the terminal 42 which is negative in that half cycle. The capacitors 66 and 67 smooth this half cycle pulse of current to cause continuous energization of the relays 30 and 55.

As before, the energization of relay 55 closes its contact 85 to maintain the entire circuit 11 energized. The energization of relay 30 moves the contact blade 29 to engage the contact 32 and this energizes the motor winding 25 directly and the motor winding 24 with a leading current through the capacitor 35. This is another way of saying that in this energization condition, the motor winding 25 has a lagging current relative to that current through motor winding 24. This is the reverse energization condition to that established with clockwise rotation of potentiometer 46, and accordingly, the motor 12 will rotate counterclockwise to drive the antenna to its newly selected position. This also drives the potentiometer 47 in a counterclockwise direction to rebalance the bridge by decreasing the resistance. Again, upon rebalance of the bridge, a null condition will be achieved at the bridge output terminals 43 and 45 which will cause cessation of current conduction through transistor 54 and de-energization of the relays 55 and 30. De-energization of relay 55 de-energizes the entire circuit and de-energization of relay 30 permits its return to its normal condition engaging contact 31. Capacitor 67 may be made of a larger capacity than capacitor 66. This will achieve a longer time constant and will assure that the relay 55 will be the first to pull in and the first to drop out. Since relay 30 will be the last to drop out, this means the contacts 85 of relay 55 will be those which actually interrupt the current and relay contacts 31 and 32 will not interrupt the current, hence, this may be made a light duty relay for economy. Also, this assures that the entire circuit will be de-energized before relay 30 changes its contact condition. Thus, there will not be any last minute reversal of the motor 12 just as the circuit is de-energized.

Additionally, the manual switch 28 performs a desirable function of preventing energization of the motor 12 until the motor direction of rotation has been established. Both the relays 55 and 30 will be energized within about 1/10 second after movement of the potentiometer 46 in a counterclockwise direction. Alternatively, if the potentiometer 46 is rotated clockwise, only relay 55 is energized, as set forth above. Either of these two energization conditions occurs within the aforesaid 1/10 second and, hence, the motor direction of rotation is established within this short period of time after movement of the potentiometer 46. Accordingly, after the knob 88 is moved to the desired new position for the antenna 36, this knob 88 may be released at any time after this 1/10 second and the motor direction of rotation will already have been established. This prevents the motor from starting rotation in one direction and then changing direction immediately thereafter should the relay 30 pull in after the motor started rotating in the opposite direction. Thus, this manual switch 28 provides this desirable function of preventing false initial direction of rotation of the motor 12.

Accordingly, the above description shows that the input may have two different phase conditions. With the first phase condition of the input only relay 55 is energized and with the second phase condition of the input, both relays 30 and 55 are energized. The entire phase sensitive circuit 11 is thus a load energized in both phase conditions of the input. Both of these phase conditions are amplified by the common amplifier 54 but separate circuit paths are provided from this transistor 54 to the voltage source of the secondary 22. One such circuit path is through relay 55 alone and diode 62 and the other circuit path is through the two relays 55 and 30 in series and the diode 63. These two different relay energization conditions establish two different directions of rotation of the motor 12. Accordingly, it will be seen that the transistor 54 is connected in two separate paths of different phase responsive character so that phase reversal of the input from the bridge 14 causes phase selective current flow in the two separate circuit paths. Further, it will be seen that when the input signal to the amplifier is of one phase characteristic, the motor will operate in one direction and when the input signal is of another phase characteristic, the motor 12 will operate in the other direction, both as established by the two separate circuit paths from the common amplifier 54.

Figure 3:
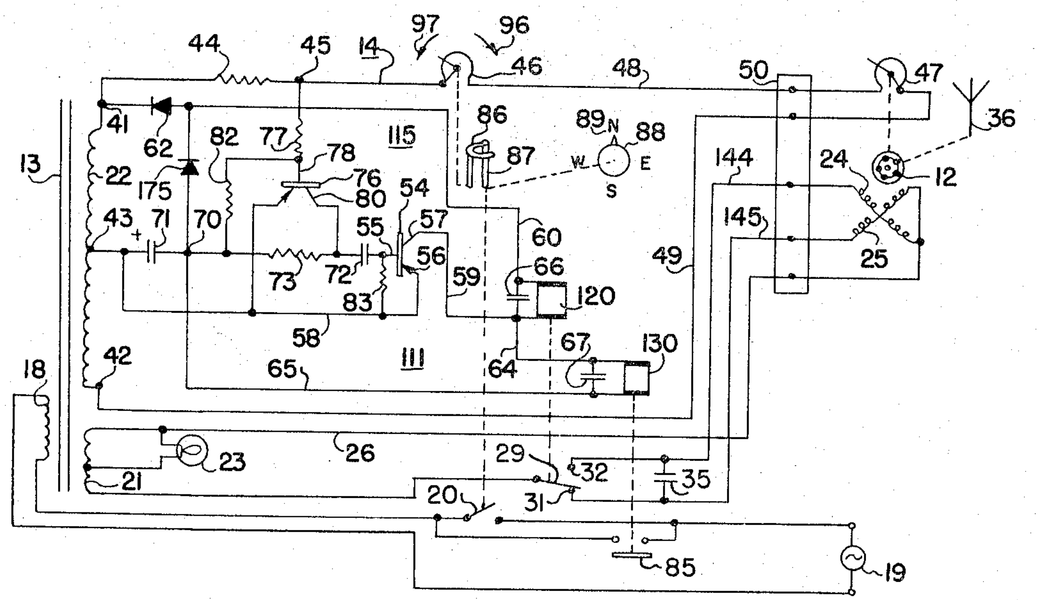
FIGURE 3 is a circuit diagram of a modified form of the invention.

FIGURE 3 shows a phase sensitive circuit 111 which is similar in many respects to the circuit 11 of FIGURE 1. The transformer 13 and bridge circuit 14 may be the same and the same reference numerals have been applied to similar parts of both circuits of FIGURES 1 and 3. The circuit 111 incorporates an amplifier circuit 115 which is quite similar to the amplifier circuit 15 of FIGURE 1 as far as the connections to the transistors 54 and 76. However, it supplies energy to two relays 120 and 130. The collector 57 is connected through a conductor 59, through the coil of relay 120 through conductor 60 and through diode 62 to the voltage source terminal 41. Also, the collector 57 is connected through conductors 59 and 64 to the coil of relay 130 and then through conductor 65 to the junction terminal 70. The relay 120 controls the double throw contacts 29. Relay 130 controls the normally open contacts 85. A rectifier 175 replaces resistor 68 to develop a direct voltage across capacitors 71.

*Operation*

FIGURE 3 operates in a manner quite similar to the circuit of FIGURE 1. Movement of the manual potentiometer 46 clockwise as shown by arrow 96 causes the establishment of voltages and current as shown in the left half of FIGURES 2A–2D. This movement unbalances the bridge 14 and initial movement of the knob 88 acts through the lost motion means to close the manual switch 20. This clockwise movement of potentiometer 46 establishes the bridge output signal from terminal 43 to terminal 45 to be out of phase with the reference voltage 91 from terminal 42 to terminal 41. Accordingly, it is in phase with the voltage from terminal 41 to terminal 42. The bridge output signal 92 on the first half cycles establishes no conduction through transistor 54 because the conduction through the pre-amplifier transistor 76 drives base 53 of the main transistor amplifier 54 in a positive direction. Thus, this transistor 54 is shut off. In the second half cycle, however, the positive going signal on the base 78 establishes a negative going signal on the base 53 as shown in FIGURE 2C and this provides a half wave pulse of current 94, FIGURE 2D, through the transistor 54. This pulse of current flows to the terminal 41 which is negative and this current flow is through the relay coil 120 to energize this relay coil. Capacitor 66 smoothes the half wave pulses to maintain energized this relay. The turn-on of the transistor 54 also energizes the relay 130 because it is supplied with a DC operational voltage from the DC voltage source developed across the filter capacitor 71. Energization of relay 130 closes the contacts 85 thereof and hence maintains energized the primary circuit of the transformer 13. Accordingly the knob 88 may be released to open manual switch 20 and again this energization of the relay 130 will take place within about one-tenth of a second. The closing of relay blade 29 against contact 32 establishes an energization circuit for the motor 12 from the secondary 21. The motor 25 is supplied with a leading current through capacitor 35 to establish motor rotation in one direction, for example, clockwise to rotate the antenna 36 to the desired position. Also, the potentiometer 47 is driven in a clockwise direction toward rebalance of the bridge. Upon rebalance of the bridge, the output voltage of this bridge decreases to a null whereat relay 130 is de-energized. This de-energizes the transformer 13 stopping the motor 12 at the desired position.

If the potentiometer 46 is rotated counterclockwise as shown by arrow 97, the bridge output voltage will be unbalanced in the opposite phase condition. This is shown in the right half of FIGURES 2A to 2D with the bridge output signal 92 being in phase with the reference voltage 91 from terminals 42 to 41. On the second half cycles, no current is supplied by the transistor 54 because the base is being driven positive to cut off this transistor 54. However, during the first half cycles as the input signal swings positive, this is a positive going signal on the base 78 and, hence, a negative going signal on the base 53 of transistor 54 to cause conduction through the transistor 54. This transistor output current flows from the emitter 56 to collector 57, through conductor 64 and the coil of relay 130, and through conductor to the direct voltage 70. This energizes relay 130 with capacitor 67 keeping the contacts closed. This establishes the opposite directional rotation of motor 12, for example counterclockwise. This rotates the antenna 36 in the desired direction and also drives the potentiometer 47 toward rebalance of the bridge circuit 14. Upon this rebalance condition being attained, relay 130 is de-energized by lack of sufficient current through transistor 54 and the entire circuit is de-energized upon opening of relay contacts 85.

It will be noted that this circuit of FIGURE 3 has first and second load conditions established by the phase of the input signal relative to the reference voltage source. In one phase condition, relay 130 is energized and in the other input phase condition, both relays 120 and 130 are energized. Thus, this differing phase condition on the input establishes selective energization of first and second relay means and establishes selective bi-directional rotation of the motor 12.

In the circuit of FIGURE 3, it will be noted that the two relays 120 and 130 operate on different phase characteristics of the input. Relay 130 actually operates on DC and relay 120 operates on half wave pulses supplied when terminal 41 is negative and when the input signal is in phase with the second half cycle of the reference voltage. Thus, it will be seen that there are two separate circuit paths from the transistor 54 to the voltage source means with different phase responsive characteristics so that phase reversal of the input causes phase selective current flow in said separate circuit paths.

Figure 4:
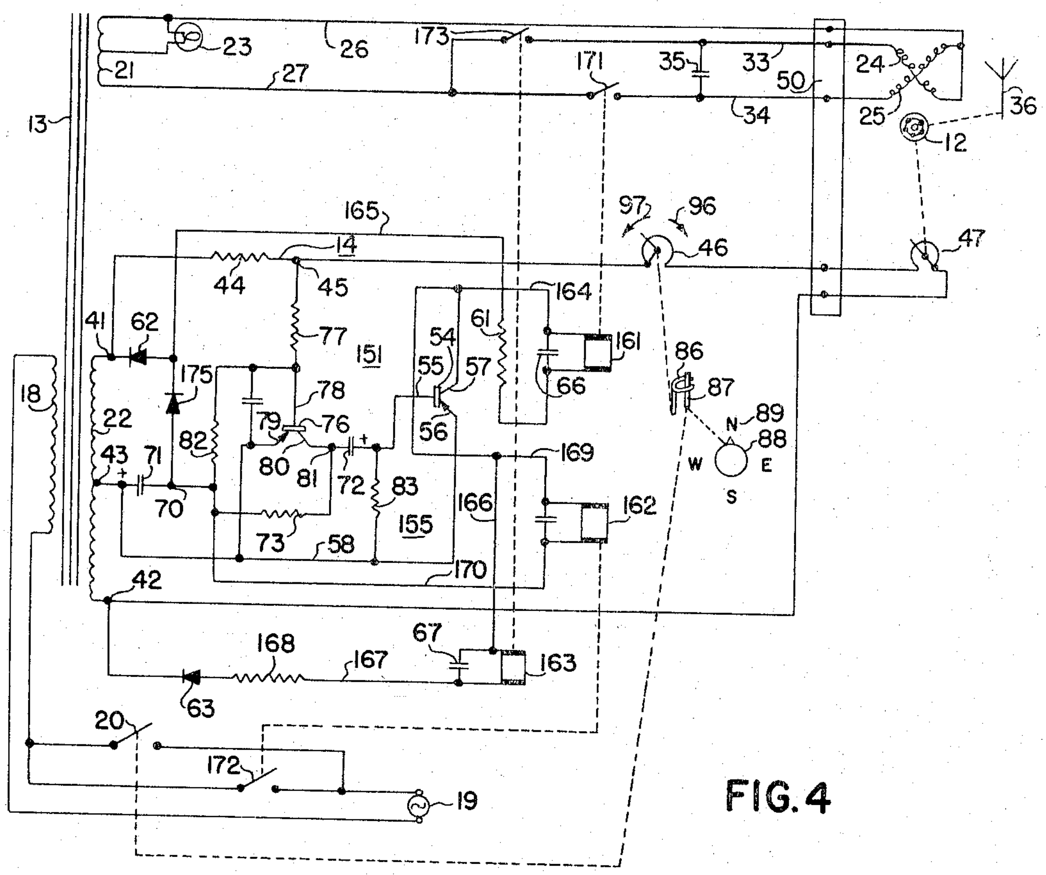
FIGURE 4 is a circuit diagram of another modification of the invention.

FIGURE 4 shows a phase sensitive circuit 151 quite similar to that shown in FIGURES 1 and 3. This circuit 151 incorporates an amplifier circuit 155 again similar to that shown in FIGURE 1 and FIGURE 3, except for changes in the relay circuit which is loaded for the main amplifier 54. This amplifier circuit 155 supplies energy to three relays 161, 162 and 163. The relay 161 is connected from the collector 57 of transistor 54 through a conductor 164 to coil of relay 161, optional voltage dropping resistor 61 and conductor 165 through diode 62 to the voltage source terminal 41. Capacitor 66 is connected across the coil of relay 161 to maintain this relay closed even though energized with half wave pulses. The coil of relay 163 is connected from the collector 57 of transistor 54 by means of a conductor 166, conductor 167, optional voltage dropping resistor 168 and diode 63 to the voltage source terminal 42. The coil of relay 162 is connected from the collector 57 of transistor 54 by means of a conductor 169 and a conductor 170 to the negative DC voltage source terminal 70. In this circuit of FIGURE 4, each of the three relays controls a normally open single pole, single throw contact. Relay 161 controls contact 171, relay 162 controls contact 172 and relay 163 controls contact 173.

Conductor 27 leading from the secondary 21 leads to one side of both contacts 171 and 173. The other side of contact 173 is connected by conductor 33 to the motor winding 24. The other side of relay contact 171 is connected through conductor 34 to the motor winding 25. The relay contact 172 is connected in the energization line from the AC voltage source 19 to the primary 18 and is connected in parallel with the manual switch contacts 20. The amplifier circuit 155 is shown as having a slightly different DC voltage circuit from that shown in FIGURE 1. A diode 175 replaces the resistor 68 and resistor 69 is eliminated. This shows that the DC voltage source developed across the filter capacitor 71 may be obtained by a half wave rectifier rather than a full wave rectifier. Also, the diode 175 in replacing the resistor 68, provides an additional function of preventing leakage current which might otherwise flow through transistor 54 and through relay coil 161, resistor 61 and through resistor 68 and through the DC voltage source to return to the emitter of transistor 54. If the transistor 54 leaked enough current during its normally non-conducting periods, this might possibly cause energization of relay 161 at undesired phase portions of the reference voltage. Use of this diode 175 prevents such occurrence.

*Operation*

The circuit of FIGURE 4 operates in a manner similar to that for FIGURE 1. If the manual knob 88 is moved clockwise, this moves the potentiometer 46 clockwise in the direction of the arrow 96. This decreases the resistance and shifts the phase of the point 45 to be in phase with the voltage from terminal 43 to terminal 42. Again, this will cause conduction through the transistor 54 on a second half cycle relative to the reference voltage, such as is shown in the left half of FIGURE 2A–2D. This conduction will energize the relay 161 rather than the relay 163 because it is the terminal 41 which is negative during that half cycle rather than the terminal 42. This energization of the relay 161 closes the contacts 171 thereof for direct energization of the motor winding 25 and leading current energization through capacitor 35 of the motor winding 24. This causes clockwise rotation of the motor 12 and rotation of the antenna 36 toward the desired position. Also, the motor 12 drives the potentiometer 47 toward rebalance of the bridge.

The turn-on of the transistor 54 also energizes the relay 162 since it is supplied with a DC operational voltage from the DC voltage source developed across the filter capacitor 71. Energization of relay 162 closes the contacts 172 thereof and, hence, maintains energized the primary circuit of the transformer 13. Accordingly, the knob 88 may be released to open manual switch 20 and again this energization of the relay 162 will take place within about 1/10 second.

Upon rebalance of the bridge, the voltage output of the bridge will fall into a null to cause the transistor 54 to cease conduction and, thus, de-energize the relays 161 and 162. This of course, de-energizes the entire circuit by opening the relay contacts 172.

If the knob 88 is moved in a counterclockwise direction, this moves the manual potentiometer 46 in a counterclockwise direction as shown by the arrow 97. This establishes the set of conditions shown in the right half of FIGURES 2A to 2D. The phase of the bridge output voltage will then be in phase with the source voltage from terminals 43 to 41. This causes conduction through the transistor 54 in the first half cycle of the reference voltage and this energization will flow through the relay 163, since it is the terminal 42 which is negative during those half cycles. This energizes the relay 163 to close contacts 173 and energizes the motor for counterclockwise rotation. Concurrently with the turn-on of the transistor 54, the relay 162 is again energized to close the contacts 172 and maintain the entire circuit energized. The motor runs counterclockwise to move the antenna to the desired position and the potentiometer 47 is also driven counterclockwise to decrease the resistance thereof toward a rebalance of the bridge. Again, upon bridge rebalance, the transistor 54 ceases conduction to de-energize relays 162 and 163 to de-energize the entire circuit.

The circuit of FIGURE 4 shows how three relays may be energized with the first and third relays controlling the direction of motor rotation and the second relay being always energized whenever there is an output voltage from the bridge. Accordingly relay 162 is a load and the entire phase sensitive circuit 151 is a load energized in both phase conditions of the bridge. Relay 161 or 163 is a load and motor 12 is a load energized for one direction of movement in only one phase condition of the bridge.

The circuits of FIGURES 1, 3 and 4 are shown as motor control circuits but it will be observed that they are control systems or apparatus for sensing the phase and, more particularly, a reversal of phase of an AC input voltage. The first and second diodes 62 and 63 together with the AC source of the secondary 22 form first and second power supply means of differing phase responsive character and wherein the two power supply means are each conductive only on opposite half cycles of the voltage of the AC source.

The transistor 54 is a form of amplifier having input and output means and more particularly is shown as a semi-conductor amplifier having first, second and third electrodes. This is broadly a type of amplifer in all three circuits which is capable of amplifying two input signals of differing phase responsive character with first and second load means in the output of the amplifier in separate circuit paths.

The operation of FIGURES 1, 3 and 4 has been described as stating that where the potentiometer 46 is rotated clockwise, for example, then the motor 12 also rotates clockwise. If the potentiometer 46 is of the type which will permit continuous rotation in one direction without any physical stops, then the motor 12 need not rotate in the same rotational direction as the potentiometer 46. Instead, one may rotate the potentiometer in a given direction across the point where this potentiometer changes from maximum to minimum impedance and then the motor will rotate in the appropriate direction, which may be the opposite direction in order to effect a rebalance of the bridge circuit. For example, suppose that the potentiometer had the change from maximum to minimum impedance at the South position and no physical stops were provided, then if one rotated the knob clockwise from the SE to the SW position through a 90 degree arc, then this would first decrease and then increase the impedance which would give a signal, upon release of knob 88, so that the motor would rotate in the opposite direction, namely, counterclockwise, to drive the potentiometer 47 counterclockwise to decrease the impedance thereof toward a rebalance of the bridge. Accordingly, it will be noted that all three circuits are follow-up motor control systems which tend to establish a rebalance of the bridge regardless of the direction of upsetting influence in the bridge circuit.

Although this invention has been described in its preferred form with a certain degree of particularity, it is understood that the present disclosure of the preferred form has been made only by way of example and that numerous changes in the details of the circuit and the combination and arrangement of circuit elements may be resorted to without departing from the spirit and scope of the invention as hereinafter claimed.

What is claimed is:

1. A phase sensing apparatus, operable from alternating voltage source means, comprising in combination,
- an amplifier having an input and an output from a transistor with a single output element,
- first and second loads,
- means providing an input signal to said amplifier input and having first and second alternative phase conditions greater and less than a ninety degree phase angle relative to the voltage source,
- means connecting the output from said single output element to energize both said first and second loads in one of said two phase conditions of said amplifier input,
- and means connecting the output from said single output element to energize only said first of said first and second loads in the other of said two phase conditions of said amplifier input.

2. A servo-circuit operable from alternating voltage source means comprising, in combination,
- an amplifier having an input and an output from a transistor with a single output element,
- first and second loads,
- means providing an input signal to said amplifier input and having first and second alternative phase conditions greater and less than a ninety degree phase angle relative to the voltage source,
- first means connecting the output from said single output element to energize both said first and second loads in one of said two phase conditions of said amplifier input,
- second means connecting the output from said single output element to energize only said first of said first and second loads in the other of said two phase conditions of said amplifier input,
- means connecting said first load to maintain energization of said second load,
- and means connecting said second load to affect said input signal providing means to effect a termination of said input signal to said amplifier input.

3. A control system, comprising, in combination,
- a balanceable bridge having an input and an output,
- means to energize said bridge at said input from an alternating voltage source, an amplifier connected to said output and having a transistor with a single output element, first and second relays, means to unbalance said bridge in first and second directions to obtain a bridge output signal of first and second phase conditions, respectively, relative to the voltage source, first means connecting the output from said single output element through said first relay to the alternating voltage source to energize said first relay in each of said two phase conditions of said bridge output, second means connecting the output from said single output element through said second relay to the alternating voltage source to energize said second relay in only one of said two phase conditions of said bridge output, means connecting said first relay to maintain energization of said bridge, and means connecting said second relay to effect a rebalance of said bridge.

4. A circuit as defined in claim 3, including means to connect said first and second relays in series for energization of said first and second relays in said one of said two phase conditions of said bridge output.

5. A circuit as defined in claim 3, including rectifier means deriving a second power source of direct voltage from the alternating voltage source, said first and second relays being the only relays energized from the alternating voltage source and said direct voltage source, a motor connected to rebalance said bridge and energizable for rotation in each of two directions, said second relay having energized and deenergized conditions, and the energized condition of said second relay establishing one direction of rotation of said motor and the deenergized condition of said second relay establishing the opposite rotational direction of said motor.

6. A circuit as defined in claim 3 including rectifier means deriving a second power source of direct voltage from the alternating voltage source, a third relay, said first connecting means including the connection of said first relay to said direct voltage source, and means connecting the output from said single output element through said third relay to the alternating voltage source to energize said third relay in only the other of said two phase conditions of said bridge output.

7. A control system operable from AC source means, comprising, an amplifier having input and single output means, an input circuit connected to said input means and having first and second alternative phase conditions greater and less than a 90 degree phase angle relative to said AC source voltage, first and second load means, first means applying a first phase condition of said AC source means to the single output means of said amplifier for energization of only said first of said first and second load means responsive to said first phase condition being applied to said amplifier input means, and second means applying a second phase condition of said AC source means to the single output means of said amplifier for energization of both said first and second load means responsive to said second phase condition being applied to said amplifier input means.

8. A control system comprising, in combination, an amplifier having an input and an output from a single collector of a transistor, first and second terminals for connection to AC source voltage means, means providing an input signal to said amplifier input and having first and second alternative phase conditions greater and less than a 90 degree phase angle relative to said AC source voltage, power supply means including said AC source means, first and second relay means, first means connecting the output of said collector through said first relay means to said power supply means upon said input signal having said first phase condition to cause conduction of said amplifier on a first one of first and second half cycles of the AC source voltage to effect energization of said first relay means in a first phase condition, and second means connecting the output of said collector through said first and second relay means to said power supply means upon said input signal having said second phase condition to cause conduction of said amplifier on a second one of first and second half cycles of the AC source voltage to effect energization of said first and second relay means in a second phase condition.

9. An alternating current phase reversal sensing system comprising, in combination, a transistor amplifier having an input and an output from a single collector, first and second power supply means connected to first and second terminals of AC source voltage means, one of said power supply means being conductive only on half cycles of said AC source voltage, first and second relay means, means providing an input signal to said amplifier input and having first and second alternative phase conditions greater and less than a 90 degree phase angle relative to said AC source voltage, means connecting the output of said collector through said first relay means to said first power supply means to energize said first relay means upon said input signal having said first phase condition to cause conduction of said amplifier on a first one of first and second half cycles of the AC source voltage, and means connecting the output of said collector through said first and second relay means at least to said second power supply means to energize said first and second relay means upon said input signal having said second phase condition to cause conduction of said amplifier on a second one of first and second half cycles of the AC source voltage.

10. A control system for drive means having a reversible output comprising, in combination, a balanceable AC bridge having an output, means to energize said bridge from AC source voltage means, potentiometer means in said bridge, first and second power supply means connected to the AC source means, one of said power supply means being conductive only on half cycles of said AC source voltage, a transistorized amplifier having an output from a single collector, means connecting the output of said bridge to the input of said amplifier, means connecting the output of said collector to said first power supply means to effect energization of said bridge from the AC source means and to effect rotation of the output of the drive means in one direction upon movement of said potentiometer means in a first direction to unbalance said bridge output in a first direction to cause conduction of said amplifier on a first one of first and second half cycles of the AC source voltage, and means connecting the output of said collector to said second power supply means to effect energization of said bridge from the AC source means and to effect rotation of the output of the drive means in a second direction upon movement of said potentiometer means in the second direction to unbalance said bridge output in a second direction to cause conduction of said amplifier on a second one of first and second half cycles of the AC source voltage.

11. An alternating current phase discriminating system comprising, in combination, a balanceable AC bridge having an output, first and second relay means, means to energize said bridge from AC source means, poteniometer means in said bridge, first and second rectifiers connected to said AC source means and oppositely poled for conduction on opposite half cycles of the voltage thereof, a transistorized amplifier having an output from a single collector, means connecting the output of said bridge to the input of said amplifier, means connecting the output of said collector through said first rectifier to said AC source means to energize only said first of said first and second relay means upon movement of said potentiometer means in a first direction to unbalance said bridge output in a first direction to cause conduction of said amplifier on a first one of first and second half cycles of the AC source voltage, and means connecting the output of said collector through said second rectifier to said AC source means to energize said first and second relay means upon movement of said potentiometer means in the second direction to unbalance said bridge output in a second direction to cause conduction of said amplifier on a second one of first and second half cycles of the AC source voltage.

12. A followup control system for drive means having a reversible output comprising, in combination, a balanceable AC bridge having two output terminals, first and second relay means, means to energize said bridge from AC source means, means including contact means of said second relay means connected to said AC source means for selective bi-directional rotation of the output of said drive means, potentiometer means in said bridge, first and second rectifiers connected to said AC source means and oppositely poled for conduction on opposite half cycles of the voltage thereof, a transistor amplifier having an output from a single collector, means connecting the output of said bridge to the input of said amplifier, means connecting the output of said collector through said first rectifier to said AC source means to energize only said first of said first and second relay means upon movement of said potentiometer means in a first direction to unbalance said bridge output in a first direction to cause conduction of said amplifier on a first one of first and second half cycles of the AC source voltage, means connecting the output of said collector through said second rectifier to said AC source means to energize said first and second relay means upon movement of said potentiometer means in the second direction to unbalance said bridge output in a second direction to cause conduction of said amplifier on a second one of first and second half cycles of the AC source voltage, and means connecting said potentiometer means to be moved in accordance with movement of the output of said drive means as a follow-up.

References Cited

UNITED STATES PATENTS

| | | | |
|---|---|---|---|
| 3,068,388 | 12/1962 | Burski | 318—29 |
| 3,126,506 | 3/1964 | Schneider | 318—28 |
| 3,155,892 | 11/1964 | Karlson | 318—207 |

BENJAMIN DOBECK, *Primary Examiner.*